United States Patent
Xu et al.

(10) Patent No.: US 6,662,067 B1
(45) Date of Patent: Dec. 9, 2003

(54) METHOD OF OPTIMIZING PART TRANSFER MOTION

(75) Inventors: Diane Xu, Ypsilanti, MI (US); Evangelos Liasi, Windsor (CA); John Thomas Karimalis, Allen Park, MI (US); Yasser Mohammed Eldeeb, Windsor (CA)

(73) Assignee: Ford Motor Company, Dearborn, MI (US)

( * ) Notice: Subject to any disclaimer, the term of this patent is extended or adjusted under 35 U.S.C. 154(b) by 602 days.

(21) Appl. No.: 09/680,850

(22) Filed: Oct. 7, 2000

(51) Int. Cl.$^7$ ............................................ G06F 19/00
(52) U.S. Cl. ..................... 700/112; 700/184; 700/192
(58) Field of Search ............................... 700/112, 113, 700/114, 184, 190; 318/573

(56) References Cited

U.S. PATENT DOCUMENTS

| | | | |
|---|---|---|---|
| 4,851,748 A | * | 7/1989 | Daggett et al. .......... 318/568.2 |
| 5,396,160 A | * | 3/1995 | Chen ........................... 318/573 |
| 6,134,486 A | * | 10/2000 | Kanayama .................... 701/23 |
| 6,438,437 B1 | * | 8/2002 | Yamaoka et al. ........... 700/112 |

* cited by examiner

Primary Examiner—Leo Picard
Assistant Examiner—Kidest Bahta
(74) Attorney, Agent, or Firm—Damian Porcari

(57) ABSTRACT

A method is disclosed that adjusts motion path parameters of a programmable part transfer device having part engaging tooling; the device is used to transfer parts between workstations of one or more cyclical stroking devices dependent on a rotary drive clock. The method comprises: setting up a non-linear analytical regression math model of the motion path of the part engaging tooling coordinated with the motions of the cyclically stroking device, the math model having motion path parameters at least for path speed, angular duration of path segments as a function of the drive clock, part stability, and dynamic freedom for said tooling within the stroking machine; initializing the math model with a first selected set of motion parameters; iteratively solving the math model to determine an optimum combination of at least path speed and part stability when transferring parts during each rotation of the drive clock, such transfer being devoid of any physical interference with the cyclically stroking device.

11 Claims, 10 Drawing Sheets

ETF Tn-axis Motion Design

Plant A1; Line B1; Press C1
Plant A2; Line B2; Press C2
Plant A3; Line B3; Press C3
Plant A4; Line B4; Press C4
Plant A5; Line B5; Press C5
Plant A6; Line B6; Press C6
Plant A7; Line B7; Press C7

Part Number:

Clamp Stroke (in.) 16

Lift Stroke (in.) 8

Feed Stroke (in.) 60

Die Opening at Clamp Start (in.) 3

Die Opening at Unclamp End (in.) 3

Timing Overlap (deg.):

Lift - Feed  20    Feed - Lower  20
Return - Clamp  25    Unclamp - Return  25

[Generate Motion Parameters]    [Cancel]

Motion Parameters

| | Start (deg.) | End (deg.) |
|---|---|---|
| Clamp | 199 | 260 |
| Lift | 260 | 290 |
| Feed | 280 | 349 |
| Lower | 320 | 14 |
| Unclamp | 7 | 77 |
| Return | 48 | 169 |

| | Stoke (in.) |
|---|---|
| Clamp | 20 |
| Lift | 10 |
| Feed | 78 |

Reference

| Dur (deg.) | Speed (spm.) |
|---|---|
| 61 | 15.5 |
| 30 | 10.5 |
| 69 | 10.2 |
| 54 | 18.8 |
| 70 | 17.7 |
| 121 | 17.9 |

Max Speed (spm) 10.2

FIG.10B

Motion Parameters

| | Start (deg.) | End (deg.) |
|---|---|---|
| Clamp | 203 | 266 |
| Lift | 266 | 312 |
| Feed | 286 | 35 |
| Lower | 9 | 55 |
| Unclamp | 52 | 115 |
| Return | 93 | 232 |

| | Stoke (in.) |
|---|---|
| Clamp | 20 |
| Lift | 10 |
| Feed | 78 |

Reference

| Dur (deg.) | Speed (spm.) |
|---|---|
| 63 | 16.0 |
| 46 | 16.1 |
| 109 | 16.1 |
| 46 | 16.1 |
| 63 | 16.0 |
| 139 | 20.5 |

Max Speed (spm) 16.0

Modified Sine Function

"G" Force ± V

Interference Checking

METHOD OF OPTIMIZING PART TRANSFER MOTION

BACKGROUND OF THE INVENTION

1. Technical Field

This invention relates to the technology of physically moving parts between stations for carrying out sequential manufacturing stages, and, more particularly, to computer based methodology that permits manufacturing engineers to select motion set-up parameters that optimize production rate and manufacturing equipment life.

2. Discussion of the Prior Art

In the sequential stamping of sheet metal panels to form completed stamped parts, the motion transfer path for the panels is one of the most critical factors affecting manufacturing productivity. Motion path planning is commonly done on site in an ad hoc fashion. This requires frequent and continuing adjustment of the setup for the motion path over an extended period of use of the motion path, which adjustments may or may not enhance productivity. Typically the motion path becomes degraded as new or different physical part characteristics are experienced or newer tooling is substituted.

Applicant is unaware of any available technology which can (i) stop or reduce such degradation, (ii) analytically predict how motion path parameters will affect overall manufacturing and engineering performance, (iii) minimize any unstable oscillatory motion of a panel or part between workstations, or (iv) account for kinetics of equipment and part (inertia and part weight) during the transfer motion.

SUMMARY OF THE INVENTION

It is a primary object of this invention to provide an analytical method to (a) conveniently and quickly generate optimum motion path parameters for programmable part transfer devices in manufacturing operations, and (b) evaluate the dynamic stability of the part during such motion transfer.

The invention that meets the above object is a computer implemented analytical method that adjusts or tunes major motion parameters for quickly optimizing the transfer of stamping panels by a given transfer apparatus, subject to press and tooling constraints; the method essentially sets up a non-linear analytical/regression math model of kinematics for transferring the stamping panels and associated tooling; the math model is initialized with a first selected set of motion parameters (e.g. stroke speeds and stroke distances); and then the model is iteratively solved to determine a maximum permissive speed for the motion path, so initialized, as well as determining other optimum motion parameters. This method applies to all programmable transfer equipment for stamping operations. Other essential aspects or features of the method will be apparent from the detailed description.

BRIEF DESCRIPTION OF THE DRAWINGS

FIG. 3 is a schematic illustration of exemplary basic strokes used by the pair of rails in a tri-axis electronic transfer feed-rail system of FIG. 1;

FIG. 9 is a computer monitor interface screen display for the initializing stage;

FIG. 10A is a screen display of initial calculations, and FIG. 10B is a screen display of resultant calculations after overlap modifications and speed changes have been made;

DETAILED DESCRIPTION AND BEST MODE

Stamping presses that use programmable transfer devices to move panels or parts between stamping workstations, fall generally into the following categories: transfer feedrail mechanisms for a single press having multiple workstations; dual axis pick and place devices for adjacent presses; and robots for multiple-presses in any arrangement.

Programmable Transfer Device

Figure 1:
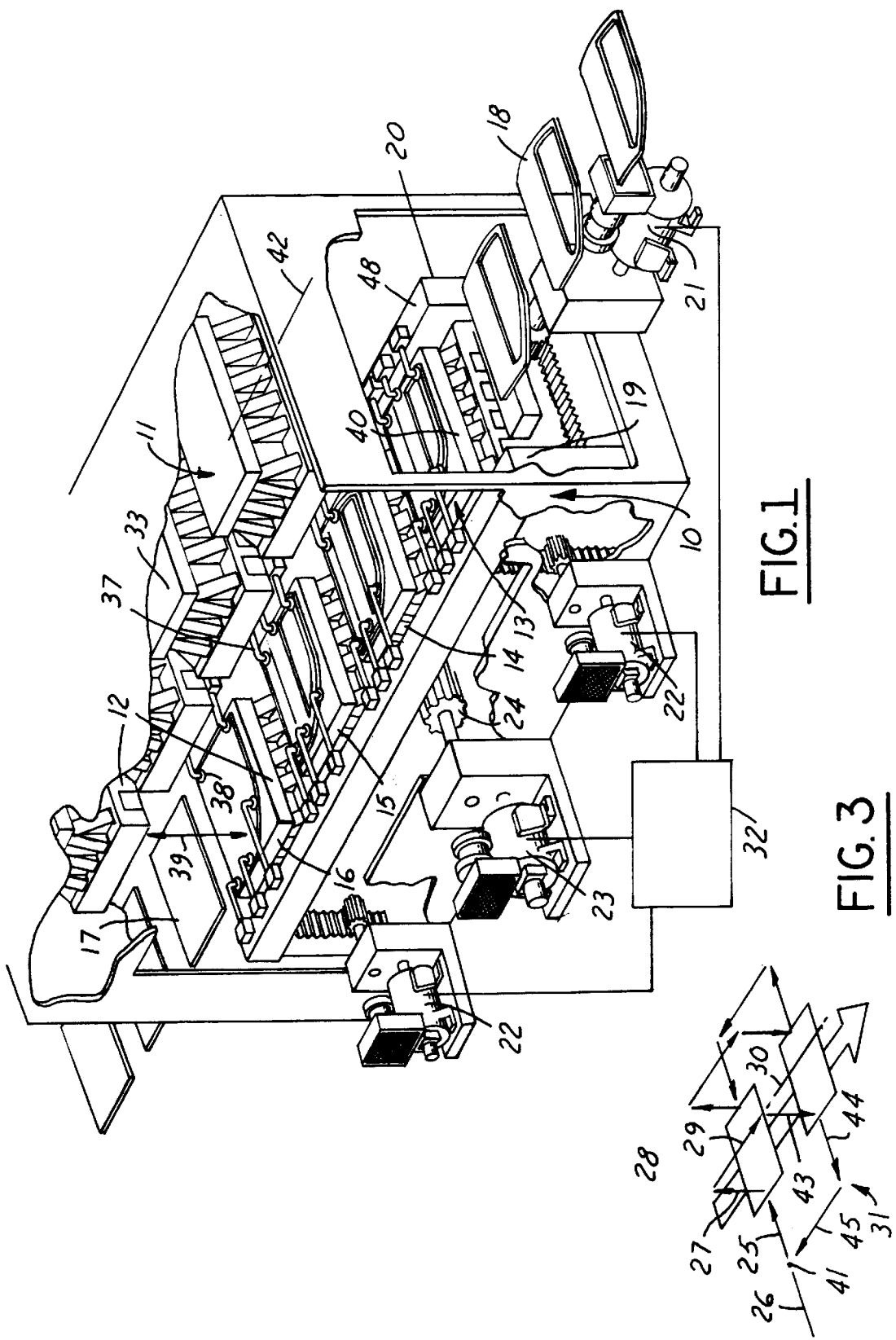
FIG. 1 is a schematic perspective view of a multi-operation stamping press using an electronic servo transfer feed-rail system having suction cup grippers for engaging stamping panels that must be carried between operations.

As shown in FIG. 1, a part transfer device 10, for a large single press 11 having multiple sets of dies 12 located at in-line workstations 13,14,15,16, carries stamping panels 17 from die set to die set; the panels 17 will be progressively drawn, stretched, trimmed or pierced at such workstations to form a finished part 18 within the single press 11. The transfer device shown is an electronic transfer feed rail system; it usually comprises a pair of transfer rails 19, 20 running the length of the press to support and convey the panels 17 from die operation to die operation. The rails are simultaneously moved in three axis or two axis motion.

In three axis motion, the transfer rails 19, 20 are moved by three separate electric motor drives 21, 22, 23, each devoted to an independent axis of motion within one of the x-y-z planes. As the motors are selectively actuated, mechanical motion linkage 24, from the motors to the rails, will carry out transfer motion with a clamping stroke 25 along one axis 26, a lift stroke 27 along another axis 28, and, a feed stroke 29 along a third axis 30 (see FIG. 3). The motors or linkage are then reversed to carry out lowering, unclamping and return motions that complete a repetitive circular path 31. Although the motion of the rails would make it appear that the transfer strokes are interconnected, each axis motor 21, 22, 23 moves independently. The individual motions are each governed by a profile drive routine 32 which electronically links the separate motions to a press slide 33, as will be described.

Figure 2:
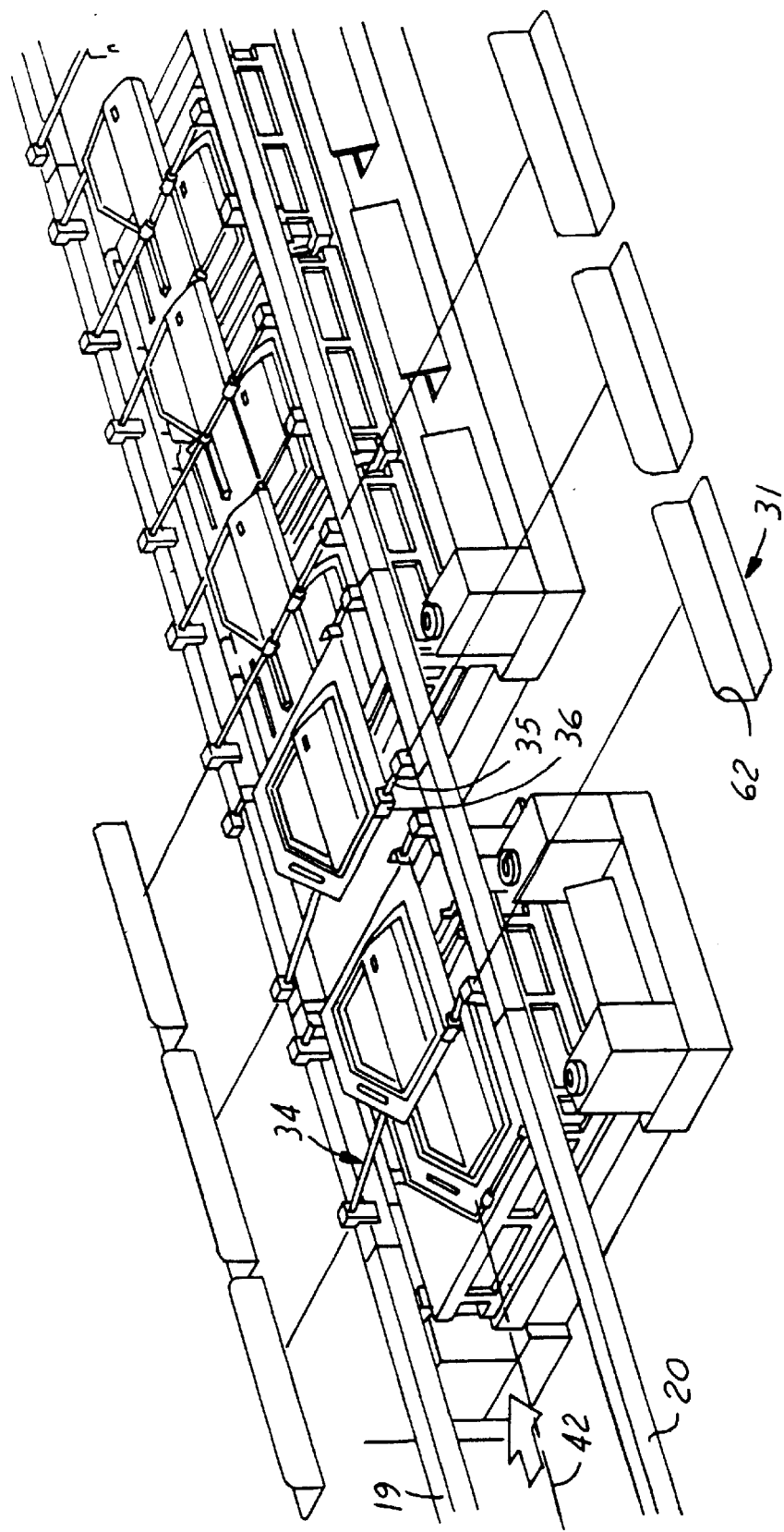
FIG. 2 is a schematic perspective view of a portion of a multi-operation press using an electronic transfer feed-rail system having mechanical grippers for engaging the edges of stamping panels.

Tooling 34 on the rails 19, 20 grip and support the panels 17. Such tooling may take the form of arms 35 with mechanically actuated hands 36 that clamp about the edges of a panel 17, as shown in FIG. 2; or the tooling may take the form of arms 37 with suction cops 38 (as shown in FIG. 1), or even adjustable brackets or gripper tubing (not shown). Suction cups are particularly useful in two axis feed-rail systems where crossbars extend between the rails and carry dependent arms with such suction cups; no x axis clamp motion is necessary because the crossbars lift and feed the panels and return again. The size and shape and weight of the tooling 34, although attached to the rails 19,20 for moving identically therewith, must be accounted for in the motion path 31 since such tooling penetrates the space 39 (see FIGS. 4 and 1) between opening and closing of the die sets 12 in an optimum relationship.

Figure 4:
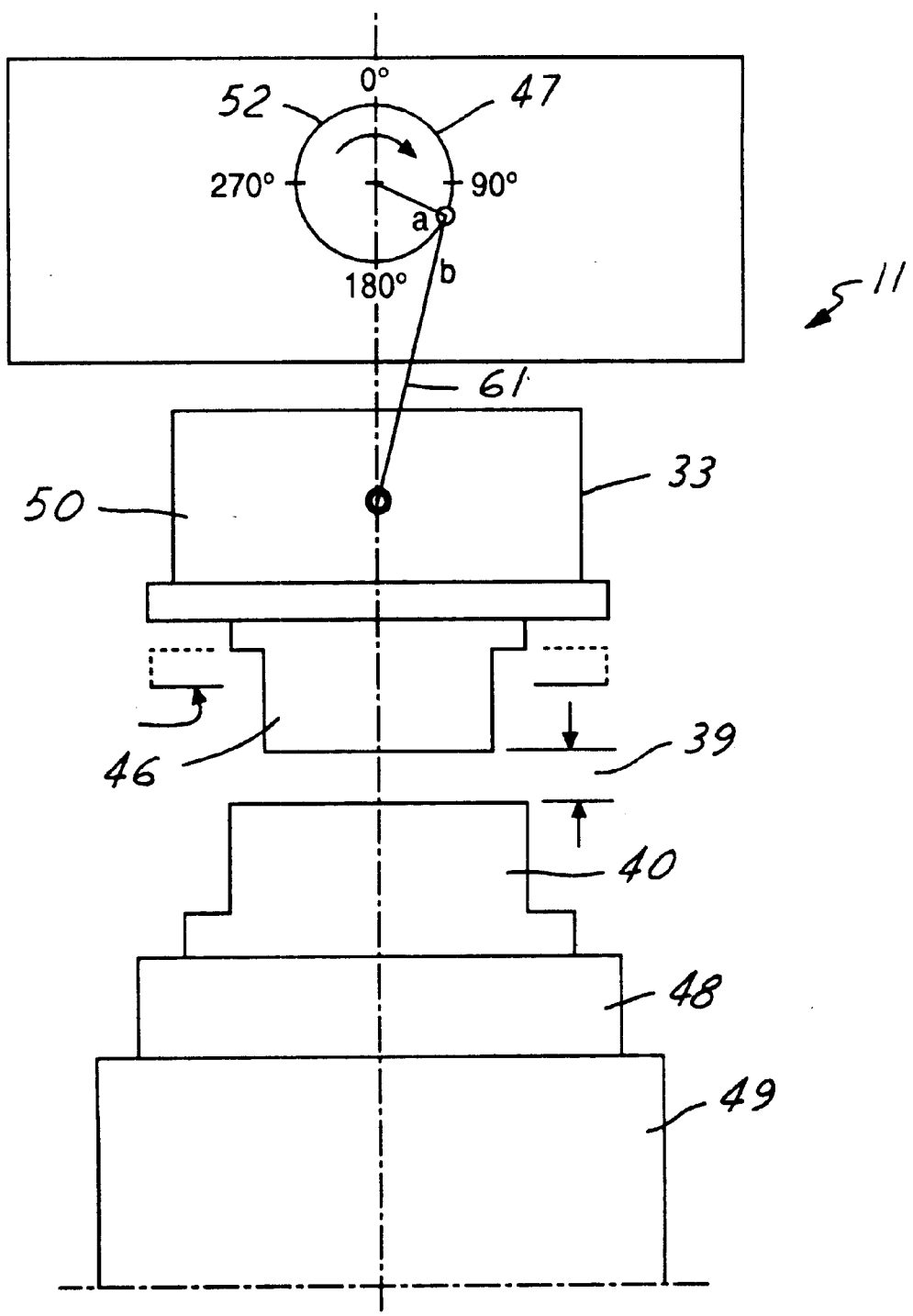
FIG. 4 is an enlarged schematic elevational view of one set of dies used in the press apparatus of FIGS. 1 or 2, showing how the upper die is linked and operated by an overhead rotary drive.
Figure 5:
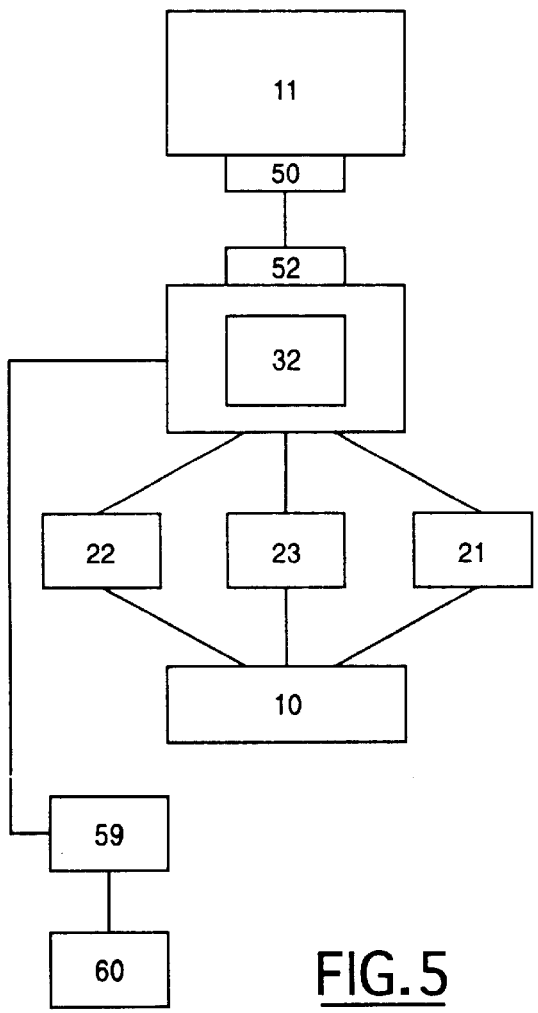
FIG. 5 is a block diagram of the key components used to carry out the method for optimizing the motion of the apparatus of FIGS. 1 or 2.

The clamp axis motor 21 moves the rails inward and outward respectively to pick-up and release panels. The lift axis motors 22 raise and lower the rails and tooling so that the gripped panels clear the lower die 40 when the die set opens. The feed axis motor 23 advances the rails and tooling so that, respectively, the gripped panels are moved to the next workstation, and then the rails and tooling return to their starting 41 for another new cycle. In the case of the electronic transfer feed-rail system, as shown in FIGS. 1 or 2, the rails simultaneously move together through the same type of motion path, except that each rail moves as the mirror reflection on the other (e.g. both rails 19, 20 move inwardly toward each other during the clamping stroke) such paired motions are schematically illustrated in FIGS. 2 and 3. As the rails are simultaneously moved reflectively with respect to a centerline 42 of the rail transfer motion path 31, the grippers 36 and 38 clamp the panel at the extreme inward portion of the clamping stroke 25. Each panel is lifted a distance to be free of both separated dies and then moved laterally parallel to the centerline 42, in a feed stroke 29 that places the panel into the space 39 between the open dies at the workstation. At the end of the feed stroke 29, the panel is lowered (stroke 43) onto the lower die 40, and the gripper arms 35 or 37 are withdrawn in an unclamping stroke 44. The rails then begin a return stroke 45 away from the dies to arrive at the same point 41 where the clamping stroke started. This completes a full 360 degree circuitous movement of the rails As shown in FIG. 4, a die set has lower die 40 fixedly supported on a bolster 48 sitting on the bed 49; the upper die 46 is supported on a vertically moving slide 50 attached to the rotary drive 47 by articulating linkage 61. A complete up and down stroke of the press upper die 46 comprises a 360 degree movement of the rotary drive 47. Linkage 24 reduces the relative impact speed (over older eccentric drive systems) by mechanically decelerating the slide near the die closure point. This greatly reduces impact and improves the drawing condition; the slide accelerates rapidly after bottom dead center. To synchronize the transfer device with the press operation, the profile drive routine 32 uses (as shown in FIG. 5) an electronic servo control 51 to electronically link the several x-y-z axis motion assemblies (controlling the transfer device 10) to the action of slide 50 of the press 11 by way of a press clock 52, serving as the master clock against which the individual stroke motions are scheduled.

Figure 6:
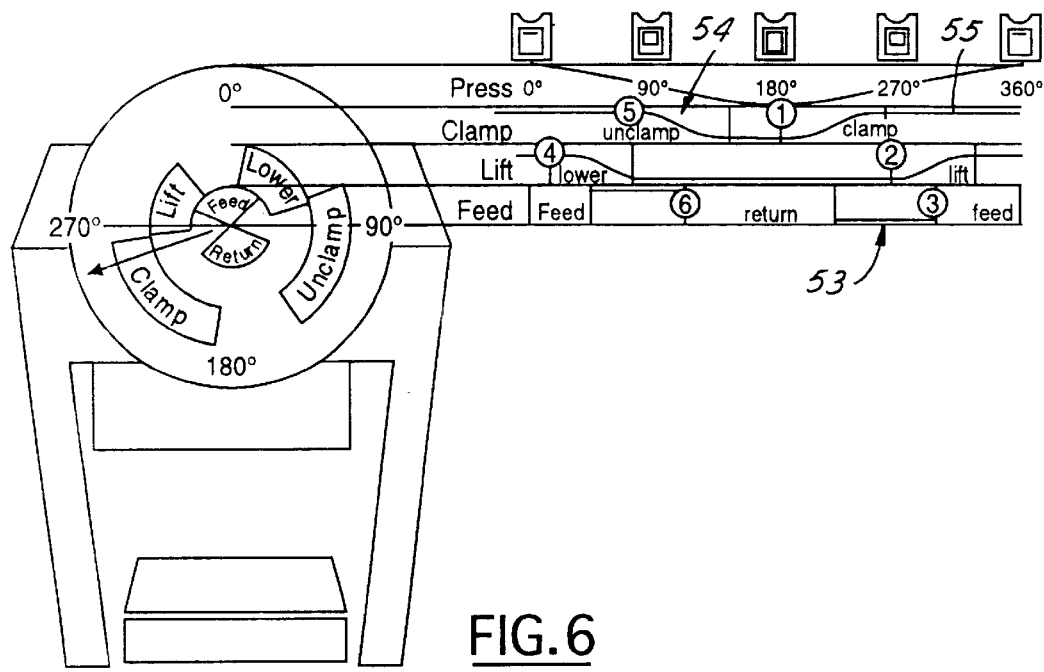
FIG. 6 is a schematic representation of a motion clock of a stamping press showing strokes of the electronic transfer feed-rail system associated with the phases of the clock.
Figure 7:
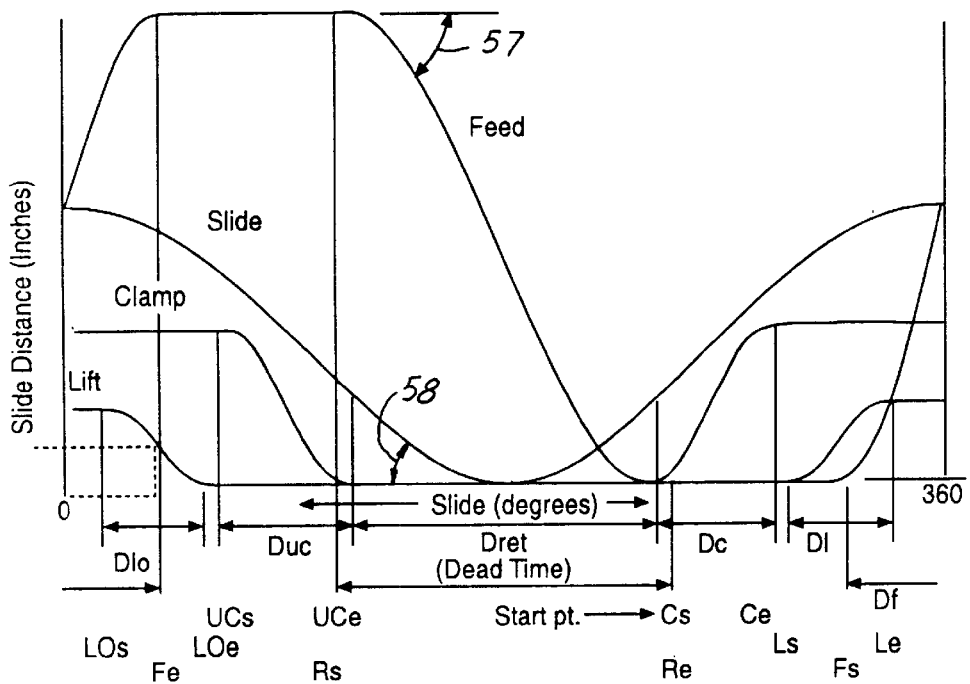
FIG. 7 is a graphical illustration of one form of timing diagram for the stroke motions of FIG. 6, here showing slide motion in inches as a function of degrees of the clock.

As shown in FIG. 6 and 7, each axis of motion of the stroke motor assemblies have their own motion profile. These profiles 53 are divided up into motion flights 54 and dwell segments 55 (layovers) with associated destinations and corresponding arrival angles 58 and departure angles 57. As shown in FIG. 5, these positions and angles are programmed by way of an HMI (human machine interface) 59 to which is connected a motion analyzer program 60 that determines such positions and angles for optimum productivity and part stability. The motion positions and angles (flights and dwell segments), hereinafter motion parameters, are completely programmable.

The profile drive routine 32 includes digital controls for electronic clutching which allows the profiles to dynamically switch between following the press clock 52 and following an internal press simulator of the analyzer 60; this permits overlapping the motion flights shown in FIG. 6, requiring overlap of vector components of the linear x-y-z strokes creating the interconnecting arcs 62 in the motion path 31 that promote faster dynamic transition between clamp, lift and feed. The timing and the degree of such overlaps require an analysis that involves consideration of the inertia of the part and transfer equipment, as well as dynamic motion restraints imposed by the equipment or part configuration that affect part stability. The synchronized motions of the press slide 50 and transfer strokes (clamp, lift, feed) are best illustrated more precisely in a timing diagram (see FIG. 7).

Each transfer motion profile has a starting point and ending point expressed in slide degrees. 360 degrees forms a window within which the motion will operate. This window can also be expressed as a time period. However, as the press runs faster, the time required to move through a window decreases.

The electric drive motors powering axis linkage 24 requires a minimum amount of time to move a particular distance. The motion flights and dwells of the strokes are defined by motion parameters.

Each parameter has a starting point, end point and distance traveled. For the 3-axis electronic transfer feed rail, the motion parameters are:

| | | |
|---|---|---|
| clamp stroke | (inches) | C |
| clamp start angle | (degree) | $C_s$ |
| clamp end angle | (degree) | $C_e$ |
| unclamp start angle | (degree) | $UC_s$ |
| unclamp end angle | (degree) | $UC_e$ |
| lift stroke | (inches) | L |
| lift start angle | (degree) | $L_s$ |
| lift end angle | (degree) | $L_e$ |
| lower start angle | (degree) | $LO_s$ |
| lower end angle | (degree) | $LO_e$ |
| feed stroke | (inches) | F |
| feed start angle | (degree) | $F_s$ |
| feed end angle | (degree) | $F_e$ |
| return start angle | (degree) | $R_s$ |
| return end angle | (degree) | $R_e$ |

These parameters are the operational inputs for an electronic transfer feed-rail transfer press. The duration of each motion is the difference between the "start" and "end" angles. The duration of each motion plays an important role in electronic transfer feed-rail engineering running capacity and production speed to obtain the best overlaps between strokes.

Due to the complexity of motion profile programming, it has been difficult for users heretofore to set up a set of motion parameters and accommodate all the considerations needed for an overall optimized motion, when carried out ad-hoc. Parameters provided by the manufacturers of the transfer equipment soon get degraded due to frequent adjustments to accommodate part changes or adjustments to avoid interferences with changing dies; the device operator cannot visually observe the onset of such motion path changes.

Method To Optimize

Figure 8:
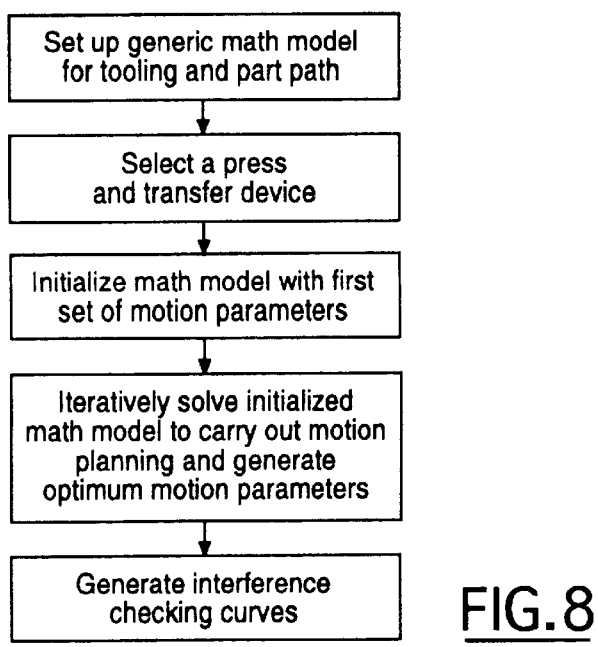
FIG. 8 is a generalized flow diagram of steps used to implement the inventive method.

The inventive method herein promotes rapid optimization of the motion path parameters for any programmable part transfer device having part engaging tooling. The method is embodied in a profile drive routine 32 for the transfer drive motors 21, 22, 23; the routine comprises a program embedded in a computer constituting part of the HMI (59), as shown in FIG. 8. The preferred method comprises, first, setting up a math model that generically depicts the motion path for any transfer tooling and panels; next, the type of press and transfer device is selected and libraries of engineering data for a specific stamping press and transfer apparatus is identified. Next, preliminary motion or control parameters are introduced to the math model for initialization, as selected from the library of engineering data for the press (type of slide motion over 360 degrees, etc.) and for the transfer device (weight, inertia, motor speed, motor torque, etc.). Motion planning is carried out as the next step using the computer for adjusting the profile drive routine; the math model is solved iteratively to optimize speed and other motion parameters. Motion parameters are the keys to a timing diagram; a change in motion parameters will result in a change in the timing diagram (see FIG. 11), hence a change in tri-axis motion-and press speed.

Returning to the first step, the math model comprehends the permissive speed for the transfer device, and its tooling, along each axis of the transfer motion from start to end of a stroke (distance). It takes the form of a non-linear regression model to evaluate speed:

$$SPM_{max} = f(D \times R \times T / I \times L \times K \times K_v \times K_a)$$

or reformed to obtain design of the stroke duration as follows:

$$D = g(SPM_{max} \times I \times L \times K \times K_v \times K_a / R \times T)$$

where

I is $I_r + I_p$ $I_r$ is inertia of rail and $I_p$ is inertia of part

D is stroke time duration

R is motor resolution maximum speed

T is motor torque

L is stroke length or rail travel distance

K is rail linear movement vs motor revolution gear ratio $K_v$, $K_a$ are velocity and acceleration factors of the profile drive routine R, $I_r$, T, K, $K_v$, $K_a$ are normally designed and determined by manufacturers of the equipment.

While part inertia (I) and stroke length (L) will vary from part to part depending on part to be stamped or produced and will vary depending on the die design characteristics. The stroke time duration (D) and motion timing (when to start and end the flight of each axis movement according to press motion) are the keys to providing optimal rail overall motion, without interference between dies and the tooling mounted on the rails-when carrying the panels from operation to operation.

In the third step of FIG. 8, the math model is initialized with setup parameters, such as shown by the initialization screen in FIG. 9. Input data for the part and die characteristics is inserted into the model, including clearance, part/die size, part depth, timing of when to move rails in and out relative to the press up and down motion, part static and dynamic characteristics, rail stroke distances, and coefficients for the press capacity. As part of the initialization, a first selected set of timing and vector overlaps for the linear strokes is made, and a first selected set of stroke speeds for the motion path is made.

Figure 12:
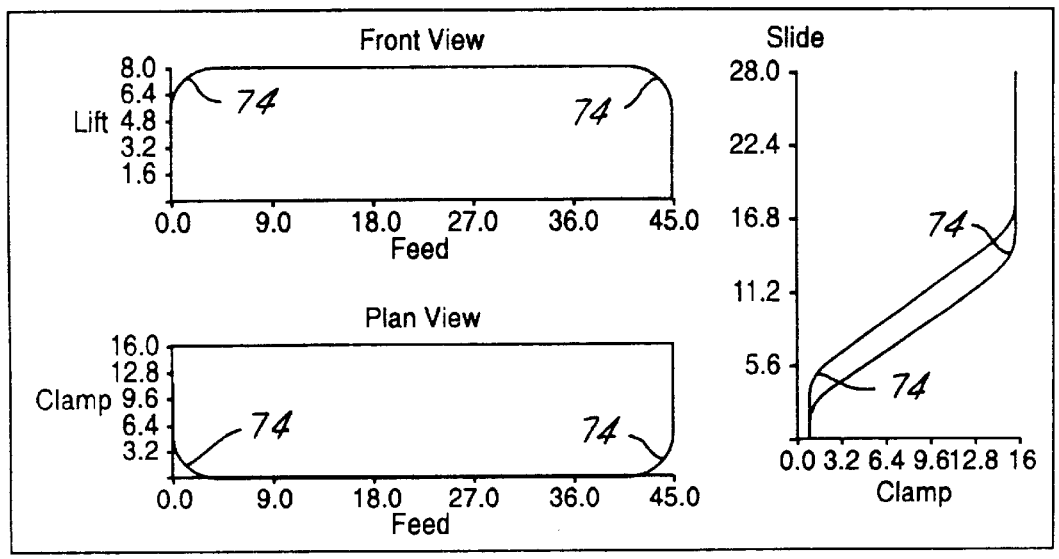
FIG. 12 is a computer screen display of the motion path for one example, showing plan, elevation and side views.

In the fourth step, the initialized model is operated to obtain motion planning. Such operation is carried out by the computer 59 and analyzer 60 to determine individual start and end positions the timing diagram (see 70,71 in FIG. 10A) and time clock durations (see 72 in FIG. 10A) that result in stroke speeds 73 and together constitute essentially a closed loop. To optimize the maximum speed (SPM), the individual stroke speeds, durations, or start and stop positions may be modified (i.e. transfer, clamp, lift, etc.) and the math model iterated to produce changed motion parameters as shown in FIG. 10B. Timing of the strokes is overlapped; the overlap of vector components results in curvilinear connecting arcs 74 for the motion path, as shown in FIG. 12.

The timing of the clamping and unclamping strokes with respect to the opening and closing of the dies is significant. The clamping stroke can be started before the dies have arrived at their desired separation distance, and the unclamping stroke can be started before the dies have started significantly to reduce their desired separating distance. Calculating the correlation, between the dynamic change in die space and stroke timing, is carried out by the math model; the model produces a superimposed plot of die slide motion and clamp stroke as a function of time.

Figures 13A, 13B:
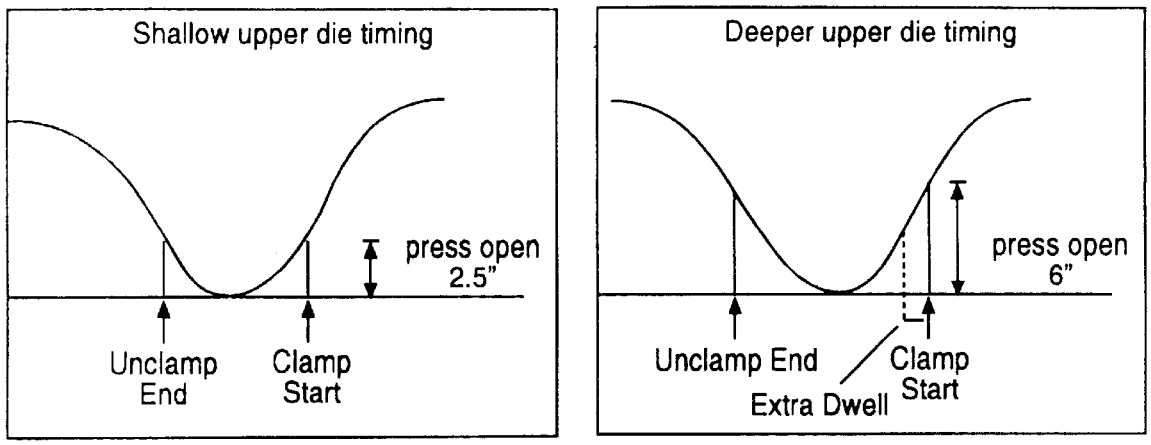
FIGS. 13A and 13B are graphical illustrations of the upper die slide movement as a function of clock angle, showing locations where the opening between dies is sufficient to permit clamping and unclamping for respectively shallow and deeper die timing.

Viewing FIG. 7, the clamp motion start time is determined by the movement of the upper die components so that when both rails start to move inwardly, the tooling will not interfere with the movement of the upper dies. In the case of a deeper upper die component, a longer dwell time before clamp start and unclamp end should be applied (see FIGS. 13A and 13B). In some instances, where the natural frequency of a part is excited by rail movement due to particular accelerations applied at certain speeds, special motion planning should be applied to eliminate this problem. Without proper motion planning, such excitation may cause extra movement and loss of control of the part, causing the tool and part to separate or the part to be dropped. In such case, the press must then be stopped to avoid damaging the dies under such circumstances.

In the case of a flimsy part, potential panel vibration and effect of gravity operating on the panel, is reduced in motion planning by using a larger stroke duration (D) for lift and by using a lower lift motion; this avoids a high acceleration motion flight. To make sure panels settle down after an operation as the dies open, a delayed motion or dwell will be applied before the start of the lift motion.

Figure 11:
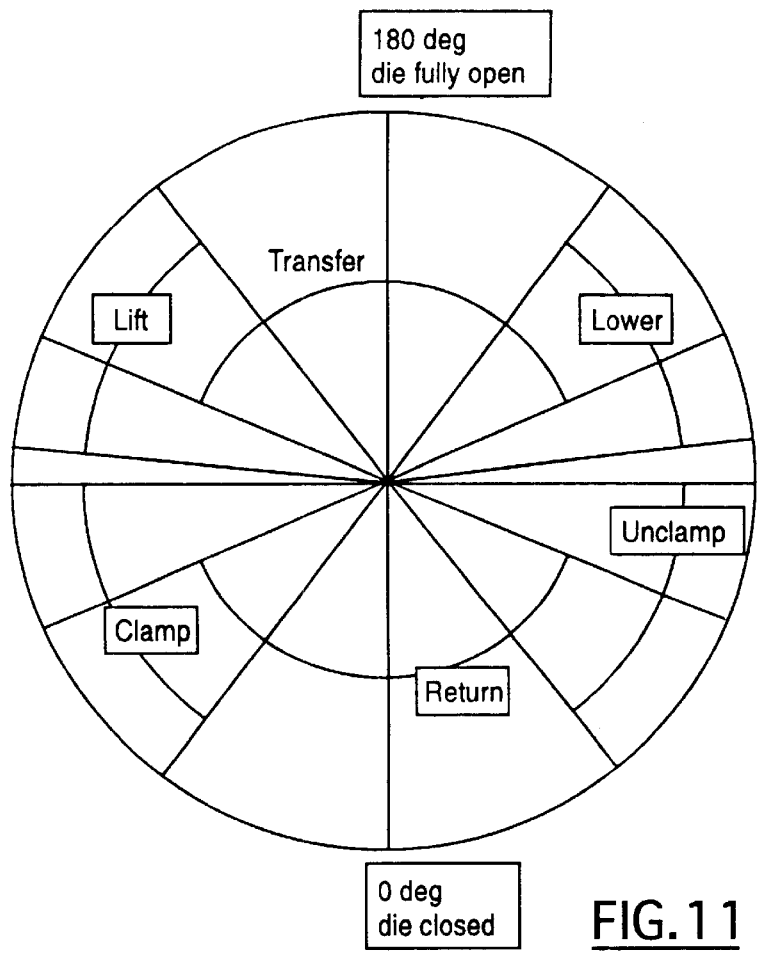
FIG. 11 is another form of timing diagram showing strokes as a pie diagram.

Advantageously, as shown in FIGS. 10B and 11, a new motion path will be generated with curvilinear arcs connecting the linear strokes. Visual plots (FIG. 11) are effective to display the interface of the rail movement against the time and space allowed between the upper and lower dies. It is desirable that the side elevation view of FIG. 11 show the clamp and unclamp strokes as close together as possible (to define a narrow envelope). This can be checked by plotting (as shown in FIG. 7) the die slide stroke with die dead time indicated along with superimposed durations for the clamp and unclamping stages on such plot. This visually ascertains whether there will be interference in fact between the dies and gripper arms.

Figure 15:
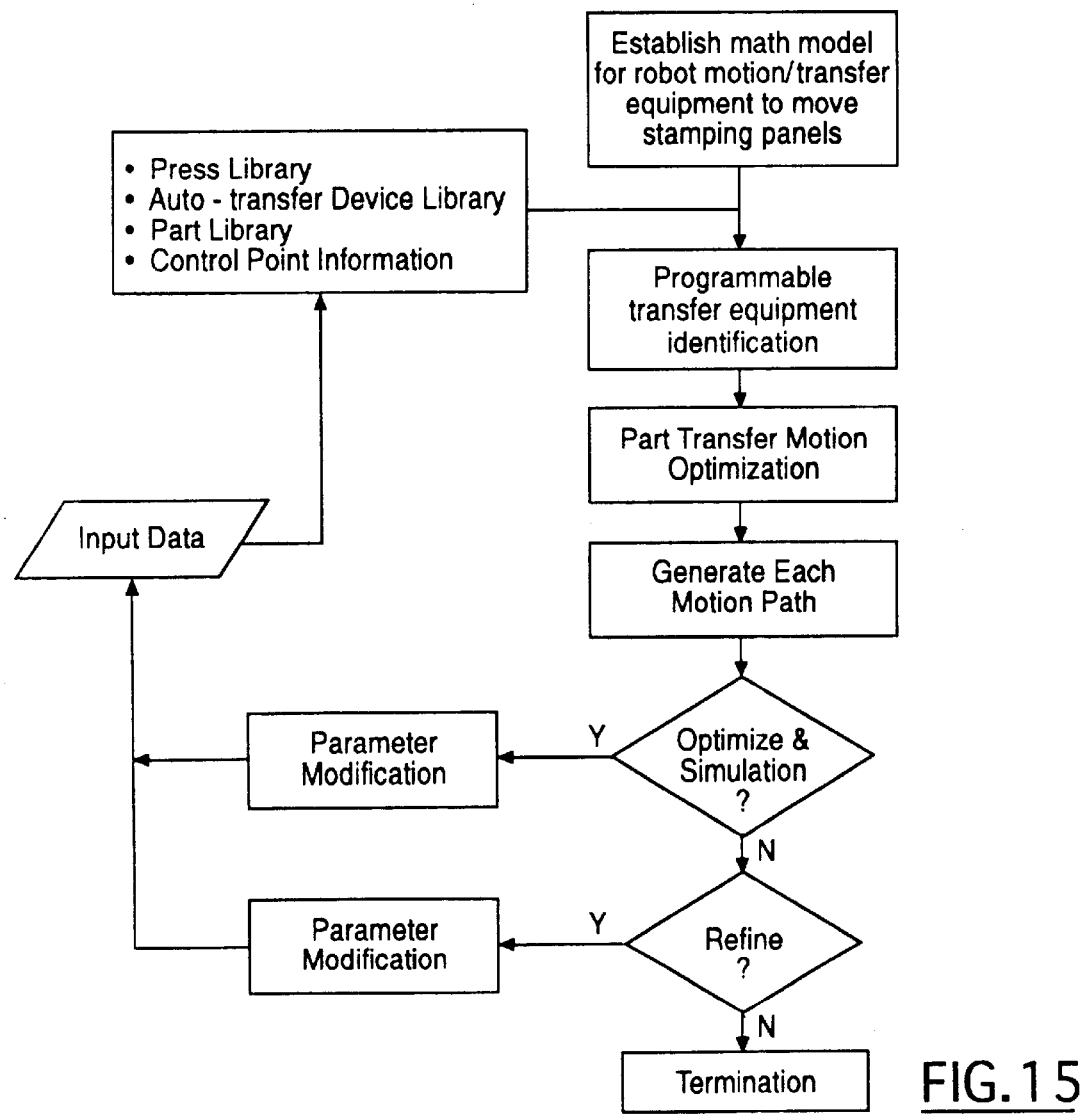
FIG. 15 is a flow diagram of the method steps used by the robot transfer apparatus of FIG. 14.
Figure 14:
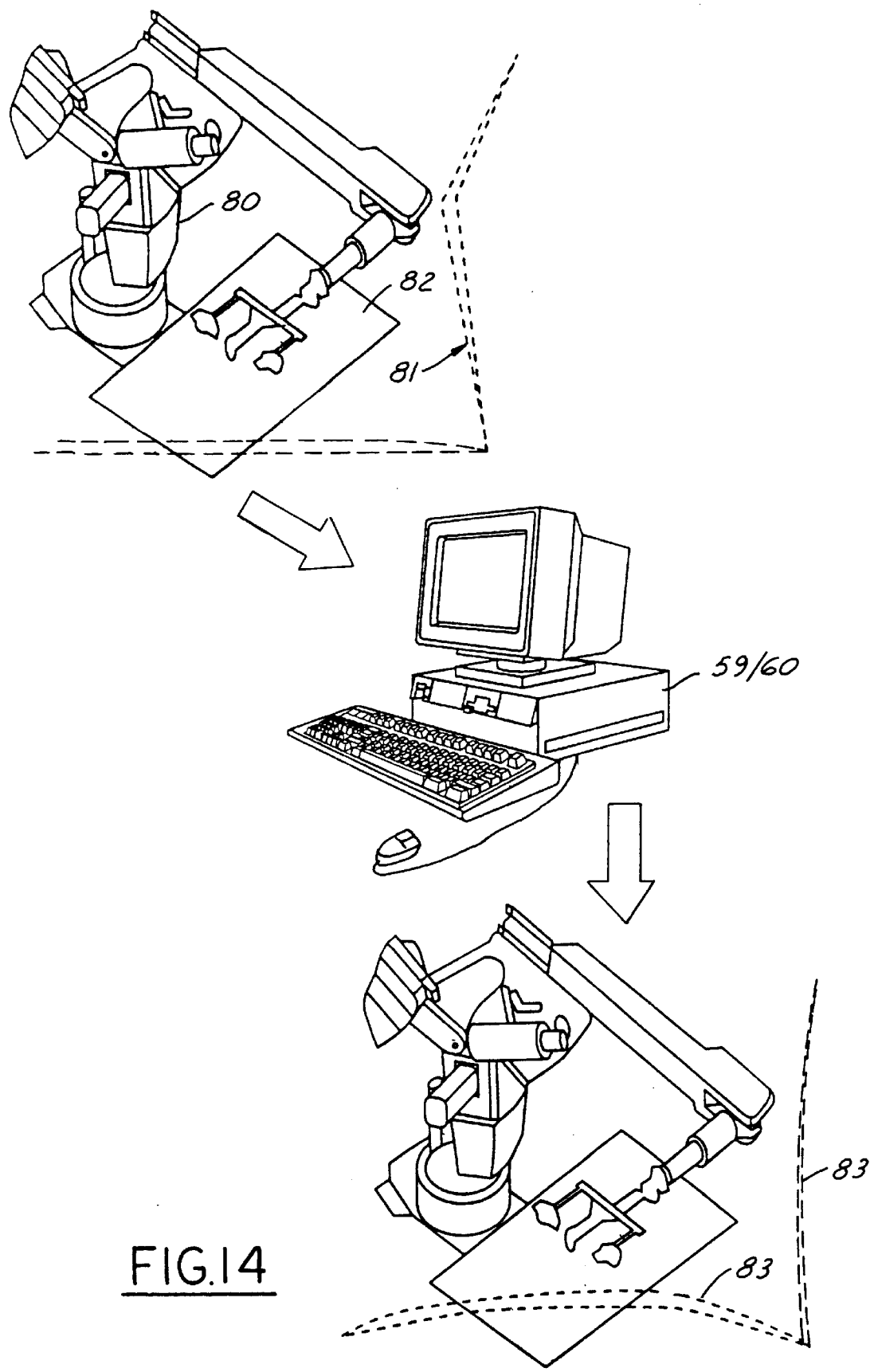
FIG. 14 is a schematic representation of the steps of the method when the transfer apparatus is a robot effective to transfer a panel, in a repeating motion path, between separate presses.

In the event a different transfer device is used, such as a robot 80, as shown in FIG. 14, the same generalized method can be followed to optimize a motion path 81 for a part 82. Such path will have timing overlaps between adjacent linear strokes to create curvilinear arcs 83 that permit increased stroke speeds. Different input data and motion equations will be required as outlined in FIG. 15.

While the best mode and viable alternatives for carrying out the invention have been described in detail, those familiar with the art to which this invention relates will recognize various alternative designs and variations for the practicing the invention as defined by the following claims.

We claim:

1. A method to adjust motion path parameters of a programmable part transfer device having part engaging tooling, the device being used to transfer parts between workstations of one or more cyclical stroking devices dependent on a rotary drive clock, the method comprising:
   (a) setting up a non-linear analytical regression math model of the motion path of said part engaging tooling coordinated with the motions of said cyclically stroking device, said math model having motion path parameters at least for path speed, angular duration of path segments as a function of the drive clock, part stability, and dynamic freedom for said tooling within said stroking machine;
   (b) initializing the math model with a first selected set of motion parameters;
   (c) iteratively solving the math model to determine an optimum combination of at least path speed and part stability when transferring parts during each rotation of the drive clock, such transfer being devoid of any physical interference with said cyclically stroking device.

2. The method as in claim 1, in which strokes of said motion path, that are with or against gravity, are increased in duration to avoid high acceleration and minimize vibration of the part during transfer.

3. The method as in claim 1, in which said stroking device is a stamping press having opposed dies which cyclically open and close to stamp the part, said optimum. combination of motion parameters modifying the motion path to avoid any physical contact of the part or tooling with said dies during each rotation of the drive clock.

4. A method to optimally adjust parameters of a motion path for a programmable electronic transfer feed-rail system that transfer parts between workstations of one or more stamping presses while each workstation linearly strokes opposed dies governed by a rotary clock, the feed-rail system having one or more rails, with part engaging tooling, that is movable along a plurality of axes by motors subject to an adjustable servo control synchronized with said rotary clock, the method comprising:
   (a) establishing an HMI with said servo control to provide adjustments of the motion path parameters;
   (b) setting up a non-linear analytical regression math model in said HMI of the motion path for the tooling on said feed-rail system, said path been comprised of interconnecting linear stroke motions along said axes which may be overlapped to create curvilinear interconnections that facilitate speed increases, said math model dynamically reflecting motion path parameters, axis permissive speeds and relative motion between the opposed dies and rails;
   (c) initializing the math model with a first selected set of motion parameters which include stroke length, stroke speed and stroke clock duration;
   (d) iteratively solving the math model with one or more modified stroke angular durations to examine probabilities for higher resultant stroke speeds at different stroke overlaps that is consistent with a circular is path; and
   (e) adjusting the servo control with motion path parameters determine its optimum by said HMI.

5. The method as in claim 4, in which said analytical math model has the form $SPM_{max} = f(D \times R \times T / I \times L \times K \times K_v \times K_a)$.

6. The method as in claim 5, in which the motion parameters of said math model (i) permit increase of lift and lowering motion angular durations for reducing the effect of gravity on the part being transferred, and (ii) permit the delay of clamp and unclamp motions to reduce natural frequency vibrations in the part being transferred as well as allow the clearance of the opposed dies, said motion parameters thereby promoting part stability and avoidance of physical interference.

7. A method for optimizing an adjustable continuous transfer motion path for part engaging tooling to carry parts between linearly stroked opposed dies of a stamping press driven by a rotary clock, comprising:
   (a) setting up a math model defining said motion path as a composite of linear strokes which may be overlapped to create curvilinear arcs connecting the linear strokes;
   (b) initializing the model with a first selected set of overlaps of said linear strokes as well as a first selected set of stroke speeds for the motion path;
   (c) operating the initialized math model to determine individual resultant stroke speeds and stroke annular durations as a function of the rotary clock that together constitute essentially 360 degrees; and
   (d) iteratively solving the math model with one or more modified stroke angular durations to examine probabilities for higher resultant stroke speeds at different stroke overlaps that is consistent with a circuitous path.

8. A method for optimizing an adjustable circular part transfer motion path between workstations in a manufacturing sequence, the sequence imposing part transfer constraints identified at the workstation and/or between workstations, comprising: identifying motion affecting parameters of a given part and a given mechanical motion transfer device for the part; initializing a math model of the motion path for the part with stroke speeds and stroke distances; solving the math model to determine a maximum limiting speed for the motion path so initialized; modifying the math model to progressively overlap and combine vector components of adjacent strokes to create curvilinear connecting arcs between strokes; and iteratively examining probabilities of resultant speeds at different degrees of overlap between strokes that avoid interference with motion constraints.

9. The method as in claim 8, in which the vector overlaps are in the range of 5–25 degrees of crank angle.

10. A method for optimizing an adjustable circular part transfer motion path between workstations in a manufacturing sequence, the sequence imposing part transfer constraints identified at the workstation and/or between workstations, comprising:
   (a) setting up a non-linear regression math model of the motion path circuit, which model includes coefficients adapted for the inertia of the part and the apparatus to carry out the transfer, as well as terms for said constraints, said model defining a motion path sectioned into linear strokes which may be more or less overlapped to create curvilinear arcs connecting the linear strokes;

(b) initializing said model with input data for stroke distances, stroke rotations as a portion of the circuit, stroke overlaps, and overall circuit speed;

(c) operating the initialized model to determine the individual resultant stroke speeds and degree of overlapped stroke rotations that together constitute essentially a closed circuit;

(d) iteratively solving the math model with one or more modified overlaps to examine probabilities for higher resultant stroke speeds and different stroke overlaps consistent with a circuitous path; and (e) adjusting the apparatus so that the transfer motion path reflects the optimum iteration of step (d).

11. The method as in claim 10, in which said motion path is carried out by a programmable robot which transfers the parts between independent stamping presses each having linearly stroked opposing dies sets governed by a rotary clock, the robot having a servo control synchronized with the rotary clock of said presses that effectively retrieves, settles and inserts parts between said dynamically stroking dies.

* * * * *